(12) United States Patent
Van Bommel et al.

(10) Patent No.: US 9,784,418 B2
(45) Date of Patent: Oct. 10, 2017

(54) LIGHTING DEVICE

(71) Applicant: KONINKLIJKE PHILIPS N.V., Eindhoven (NL)

(72) Inventors: Ties Van Bommel, Horst (NL); Rifat Ata Mustafa Hikmet, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 177 days.

(21) Appl. No.: 14/423,504

(22) PCT Filed: Aug. 13, 2013

(86) PCT No.: PCT/IB2013/056620
§ 371 (c)(1),
(2) Date: Feb. 24, 2015

(87) PCT Pub. No.: WO2014/030100
PCT Pub. Date: Feb. 27, 2014

(65) Prior Publication Data
US 2015/0184812 A1  Jul. 2, 2015

Related U.S. Application Data

(60) Provisional application No. 61/692,729, filed on Aug. 24, 2012.

(51) Int. Cl.
*F21V 9/02* (2006.01)
*F21K 99/00* (2016.01)
*F21V 9/16* (2006.01)
*F21V 13/02* (2006.01)
*F21V 13/12* (2006.01)
*F21K 9/64* (2016.01)
*F21V 13/10* (2006.01)
*F21V 5/02* (2006.01)
(Continued)

(52) U.S. Cl.
CPC .............. *F21K 9/56* (2013.01); *F21K 9/64* (2016.08); *F21V 9/02* (2013.01); *F21V 9/16* (2013.01);
(Continued)

(58) Field of Classification Search
CPC ..... F21K 2/00; F21K 9/56; F21K 9/64; A47K 3/003; F21V 9/02; F21V 9/16; F21V 13/02; F21V 13/12
See application file for complete search history.

(56) References Cited

U.S. PATENT DOCUMENTS

| 7,915,627 B2 | 3/2011 | Li | |
| 2011/0194270 A1* | 8/2011 | Di Trapani | G02B 6/001 362/2 |

(Continued)

FOREIGN PATENT DOCUMENTS

| WO | 2007085977 A1 | 8/2007 |
| WO | 2009087587 A1 | 7/2009 |

(Continued)

*Primary Examiner* — Anh Mai
*Assistant Examiner* — Nathaniel Lee
(74) *Attorney, Agent, or Firm* — Akarsh P. Belagodu

(57) ABSTRACT

The present invention relates to a lighting device (300) having a housing (302) and multiple light sources (308) arranged in the housing. The light sources emit light of a first wavelength range. The lighting device includes a wavelength converting member (310) arranged at a distance from the light sources, and it comprises a first wavelength converting material configured to convert a part of said light of a first wavelength range into light of a second wavelength range. The lighting device further includes a color distribution member (312) providing a color distribution of the light emitted from the lighting device where the ratio of intensity of light with the first wavelength range to the intensity of light with the second wavelength range is larger at low angles to a light output surface of the lighting device than at high angles to the light output surface.

13 Claims, 5 Drawing Sheets

(51) Int. Cl.
  *F21V 9/10*    (2006.01)
  *F21V 8/00*    (2006.01)
  *F21W 131/40*   (2006.01)
  *F21Y 105/10*   (2016.01)
  *F21Y 115/10*   (2016.01)

(52) U.S. Cl.
  CPC .............. *F21V 13/02* (2013.01); *F21V 13/12* (2013.01); *F21V 5/02* (2013.01); *F21V 9/10* (2013.01); *F21W 2131/40* (2013.01); *F21Y 2105/10* (2016.08); *F21Y 2115/10* (2016.08); *G02B 6/005* (2013.01)

(56) References Cited

U.S. PATENT DOCUMENTS

2012/0087104 A1* 4/2012 Dai ........................... F21K 9/64
                     362/84
2012/0170602 A1  7/2012 Hikmet et al.

FOREIGN PATENT DOCUMENTS

| WO | 2009156347 A1 | 12/2009 |
| WO | 2011033394 A1 | 3/2011 |
| WO | 2011114253 A1 | 9/2011 |

\* cited by examiner

LIGHTING DEVICE

CROSS-REFERENCE TO PRIOR APPLICATIONS

This application is the U.S. National Phase application under 35 U.S.C. §371 of International Application No. PCT/IB13/056620, filed on Aug. 13, 2013, which claims the benefit of U.S. Provisional Patent Application No. 61/692,729, filed on Aug. 24, 2012. These applications are hereby incorporated by reference herein.

FIELD OF THE INVENTION

The present invention relates to a lighting device comprising a housing and multiple light sources arranged in the housing, the light sources emitting light of a first wavelength range, and a wavelength converting member arranged at a distance from said light sources to convert light of the first wavelength range into light of a second wavelength range.

BACKGROUND OF THE INVENTION

In places without the possibility of including a window for daylight it is desirable to have a lighting device which imitates a window with day light appearance. It would be advantageous to provide such a window imitation by means of a large area lighting device. A lighting device of the initially mentioned kind generally is referred to as a large area lighting device, since the light output of the several light sources is distributed across a relatively large common output area of the lighting device. It is typically used as general lighting mounted at the ceiling of a room. It is advantageous to provide solid state lighting solutions for such lighting devices, due to the energy savings obtained in comparison with conventional light sources. Among the solid state lighting alternatives, the so called remote phosphor concept where a remote wavelength converter, typically a phosphor element, changes the colored light e.g. blue light from a solid state light source such as a LED (light emitting diode) to white light and is an efficient way of producing white light. Large area solid state lighting devices, such as LED lighting devices, are generally desirable to use for such illumination purposes. However, in tests where LED lighting devices have been mounted and tuned to emit daylight simulating white light, the appearance of the lighting devices when observed from a distance have not given the impression of a window.

SUMMARY OF THE INVENTION

It is an object of the present invention to provide a lighting device that is perceived as a window.

From further investigations it has been realized that in order for an observer to perceive a lighting device as a window, i.e. an inlet of daylight, it is desirable to have a light distribution such that at a distance from the lighting device, i.e. at low angles with respect to the plane of the lighting device (window), the observer sees blueish light giving him the perception of the sky. At high angels, i.e. directly and close to directly beneath the lighting device, when it is mounted at the ceiling, the light should be clearly white in order to serve illumination purposes at a working area. However, the large area LED lighting devices which are at hand, such as the lighting device disclosed in WO2011/114253, has a color distribution that is more or less contrary to what would be desired. The lighting device disclosed in WO2011/114253 comprises blue LEDs as light sources and a wavelength converting member, which is a phosphor plate, arranged in front of the LEDs converting a part of the blue light into red-orange-yellow light in order to obtain white light as a mix of all these colors. The use of blue LEDs is desirable from a cost perspective. However, as explained in WO2011/114253, due to different distances of passage through the wavelength converting member the distribution of non-converted blue light becomes different from the distribution of converted light. That difference result in light which is instead less bluish at low angles than at high angles.

The object mentioned above is achieved by a lighting device according to the present invention as defined in claim 1.

Thus, in accordance with an aspect of the present invention, there is provided a lighting device comprising a housing and multiple light sources arranged in the housing, the light sources emitting light of a first wavelength range; a wavelength converting member arranged at a distance from said light sources, said wavelength converting member comprising a first wavelength converting material configured to convert light of said first wavelength range into light of a second wavelength range; and a color distribution member providing a color distribution of the light emitted from the lighting device where the ratio of intensity of light with the first wavelength range to the intensity of light with the second wavelength range is larger at low angles to a light output surface of the lighting device than at high angles to the light output surface. Thereby, by including blue light in the first wavelength range, there the emitted light will be more bluish at low angles than at high angles. However, it should be noted that the lighting device is useful for providing a desired distribution of other combinations of colors at low and high angles as well. For the purposes of this application it is to be noted that by low angles are meant angles at which the lighting device is seen as remote to a viewer, typically where the very light source is not seen directly. For an ordinary luminaire this means that low angles range from approximately 60 degrees and lower, i.e. down to 0 degrees, while high angles range from about 60 degrees and higher, i.e. up to 90 degrees. However, as understood by the person skilled in the art, the border between low and high angles varies between applications, and between different environments. For example, for some applications low angels range from about 30 degrees and lower.

It is to be noted that the lighting device disclosed in above-mentioned WO2011/114253 is not useful to obtain the result according to the present invention. That prior art publication teaches the use of a reflective element downstream of phosphor member to direct light exiting the wavelength converting member in different directions, but that does not change the basic distribution of light exiting in different directions, while the lighting device according to this invention does change the color distribution such that the originally emitted blue light is leaving the lighting device at lower angles.

In accordance with an embodiment of the lighting device the color distribution member comprises a light redirecting element, arranged between the light sources and the wavelength converting member, which redirects incoming light from the light sources reaching the light redirecting element at an angle of incidence to outgoing light leaving the light redirecting element at a lower angle than the angle of incidence. This embodiment offers a robust solution.

In accordance with an embodiment of the lighting device, the light directing element comprises at least one element of a group of elements consisting of a refractive optical element, a diffractive optical element, and a waveguide. This embodiment is advantageous in that the amount of redirection of the light is accurately predeterminable.

In accordance with an embodiment of the lighting device, the light directing element has a structured surface with a prismatic surface relief, and an opposite smooth surface. The structured surface is facing the light sources. In the literature such an element is often referred to as a brightness enhancement foil (BEF). However it is usually turned the other way around. In other words the light directing element is a brightness enhancement foil (BEF) turned back to front in relation to how it is usually arranged relative to the direction of the light propagation.

In accordance with an embodiment of the lighting device, the color distribution member comprises a plurality of collimators, each arranged at a respective light source, wherein each collimator has a centre axis which is inclined with respect to a plane in which the wavelength converting member primarily extends. Thus, contrary to what is customary, the centre axis of the emitted light beams of the light sources is not perpendicular to the wavelength converting member.

In accordance with an embodiment of the lighting device, the housing is box shaped having a rear wall and side walls which are reflective on the inside, wherein a first set of light sources comprising at least some of the light sources is arranged at a side wall of the housing and emit light laterally of the housing, wherein the color distribution member comprises a plate shaped light guide extending in parallel with the rear wall, wherein said set of light sources emits light into the light guide, wherein the light guide has a front surface, which is structured and which constitutes the light output surface of the lighting device, and a rear surface, which faces the wavelength converting member, wherein a part of the light emitted by said set of light sources is leaving the light guide through the rear surface, and the rest of the light emitted by said set of light sources is leaving the light guide through the front surface, and wherein the light leaves the light guide at lower angels through the front surface than through the rear surface. Thereby, the amount of light of the first wavelength range at low angles is increased. This principle of arrangement of the light sources and the light guide is common as such from, inter alia, display applications, and is particularly suitable for applications where it is important to keep the total height of the lighting device as low as possible.

In accordance with an embodiment of the lighting device, the wavelength converting member is arranged between the rear wall and the light guide, and wherein a second set of light sources, comprising some of the light sources, is arranged at the rear wall of the housing and emits light towards the wavelength converting member. In this embodiment the lighting device has a capability of delivering a higher luminance than an embodiment having side fed light guide as the only light generator.

In accordance with an embodiment of the lighting device, the color distribution member comprises a structure of pipes extending at low angles through the wavelength converting member, and providing wavelength conversion free light passages. The advantage of this embodiment is that a single physical part provides two functions, i.e. both wavelength conversion and color distribution.

In accordance with an embodiment of the lighting device, the pipes are filled with a transparent material.

In accordance with an embodiment of the lighting device, the transparent material contains scattering material.

In accordance with an embodiment of the lighting device, it further comprises a diffuser arranged downstream of the wavelength converting member.

In accordance with an embodiment of the lighting device, the color distribution member comprises a wavelength selective refraction element arranged downstream of the wavelength converting member, which wavelength selective refraction element is arranged to refract non-converted light to low angles and converted light to high angles.

In accordance with an embodiment of the lighting device the color distribution member comprises a collimating plate arranged downstream of the wavelength converting member, and an additional wavelength converting member arranged downstream of the collimating plate, and comprising a second wavelength converting material configured to convert light of said first wavelength range into light of a third wavelength range.

In accordance with an embodiment of the lighting device, the wavelength converting member is pixelated such that the first wavelength converting material is arranged as a pattern of material portions, which are arranged alternately with a pattern of non-converting portions throughout the wavelength converting member, wherein the color distribution member comprises a pixelated optical element arranged downstream of the wavelength converting member and comprising a pattern of refracting portions, which are arranged alternately with a pattern of light collimating portions, wherein the refracting portions are aligned with the non-converting portions, and wherein the light collimating portions are aligned with the converting portions.

These and other aspects, and advantages of the invention will be apparent from and elucidated with reference to the embodiments described hereinafter.

BRIEF DESCRIPTION OF THE DRAWINGS

The invention will now be described in more detail and with reference to the appended drawings in which.

DESCRIPTION OF PREFERRED EMBODIMENTS

Figure 1:
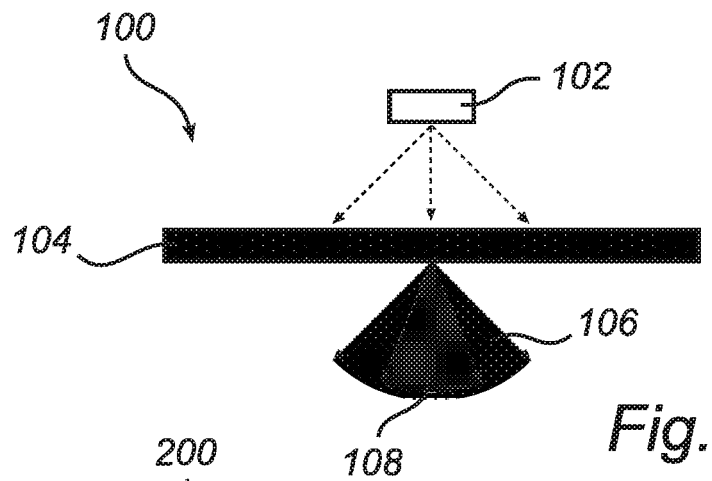
FIG. 1 illustrates prior art.

As explained above, the light distribution of the prior art lighting devices, as illustrated in FIG. 1, is unsatisfactory for the purposes of using the lighting device 100 as an artificial window. The light sources 102 emit blue light, which is light of a first wavelength range, and which is converted to a second wavelength range having a yellow color, by means of a remote phosphor element 104, which converted light 106 when mixed with a portion of the blue light 108 that remains non-converted is perceived as white light. However, the non-converted amount of light is larger relative to the converted amount of light at high light output angles with respect to the light output surface of the lighting device than at low angles, which causes an unnatural perception of the artificial window.

Figure 2:
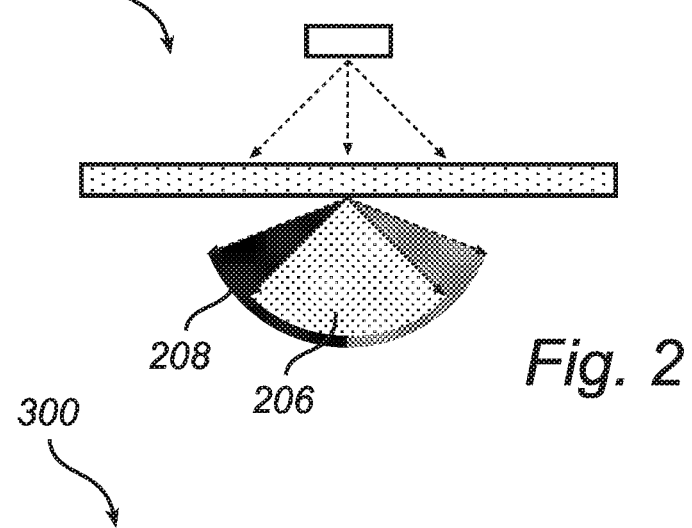
FIG. 2 is an illustration of the principle of the present invention.

The overall aimed at light output of the lighting device 200 according to this invention, as illustrated in FIG. 2, is to redistribute the non-converted light 208 to low angles while the converted light 206 is kept at a substantially similar distribution as in the prior art lighting devices. The remote phosphor element may also convert the light emitted by the light sources into other colors or combination of colors, such as red, orange, yellow, and green to obtain white light.

It should be noted that the chosen vocabulary gives room for other color combinations of non-converted and converted light than blue and red-orange-yellow-green, respectively, for other lighting applications as long as the structural principles are preserved, which other combinations are thus within the scope of the present invention. However, for sake of simplicity, below blue light and yellow light is used in addition to the general features "first wavelength range" and "second wavelength range" when explaining the embodiments.

The light sources are preferably solid state light sources such as LEDs (Light Emitting Diodes) or lasers, while other types may be used as well.

Figure 3:
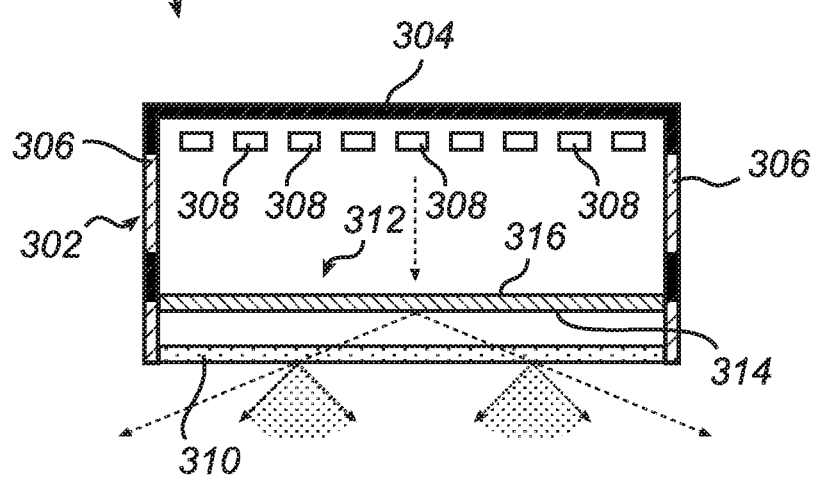
FIGS. 3-15 are schematic cross-sectional views of different embodiments of the lighting device according to the present invention.
Figure 4:
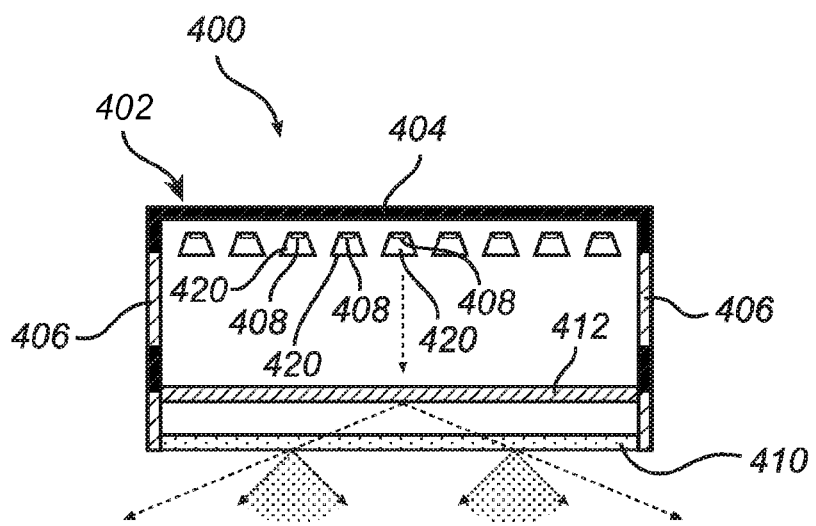
Figure 5:
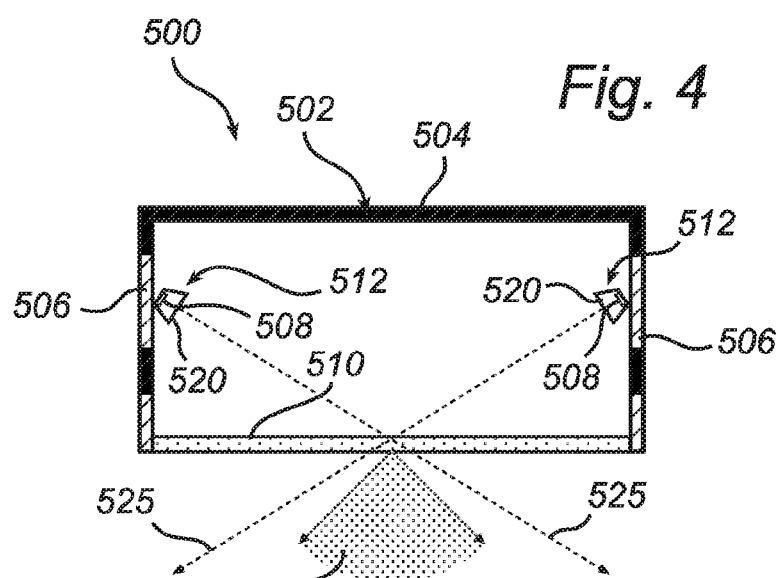

According to a first embodiment of the lighting device 300, as shown in FIG. 3, it comprises a housing 302, which is box shaped and contains a rear wall 304, and side walls 306, multiple light sources 308 arranged at the rear wall 304, a wavelength converting member 310, which is plate shaped and which embodies a front wall and a light output surface of the lighting device 300, and a color distribution member 312, which is plate shaped and which is arranged between the light sources 308 and the wavelength converting member 310.

The housing 302 has a reflective inner surface. The reflectivity is at least 80%, and in another embodiment, the reflectivity is at least 90%. The light sources are LEDs or lasers or some other kind of solid state lighting elements. The light sources emit light of a first wavelength range, and more particularly blue light i.e. a wavelength range of about 400-490 nm. Preferably, the light sources emit blue light in a wavelength range of about 440-480 nm. The wavelength converting member 310 is a phosphor element, also called remote phosphor due to its position remotely of the light sources 308, such as a few centimeters from the light sources 308. However, in some applications the wavelength converting element is arranged substantially closer to the light sources, such as a few millimeters. The wavelength converting material comprises a luminescent material such as an organic phosphor, inorganic phosphor or quantum dots. Other materials providing the same function are however feasible as well. The wavelength converting member 310 converts light of the first wavelength range to light of a second wavelength range. More particularly, in this embodiment, the blue light is converted to substantially yellow light in the range of about 490-750 nm, preferably 550-700 nm.

The color distribution member 312 is a refractive optical element, and more particularly a BEF (Bright Enhancement Foil), and, thus, it is plate shaped. The BEF 312 has a smooth surface 314 and an opposite structured surface 316, and more particularly a prismatic surface relief such as a surface provided with micro prisms. The BEF 312 is arranged back to front compared to how it is usually employed, and consequently it spreads the light emitted by the light sources 308 when passing the BEF 312 instead of collimating the light. Thus, the structured surface 316 is facing the light sources 308, while the smooth surface is facing the wavelength converting member 310. A light ray emitted from any one of the light sources 308 is refracted by the BEF 312 such that the angle β between the outgoing light ray that leaves the BEF 312 and the primary extension plane of the BEF 312, i.e. horizontally in a lighting device 300 arranged in the ceiling, and as shown in FIG. 3, is lower than the angle between the incoming light ray and that plane. Due to the light spreading function of the BEF 312, a larger share of the blue light reaches the wavelength converting member 310 at low angles than if the BEF 312 was omitted. A part of the low angle blue light is converted by the wavelength converting member 310, and thereby it is redistributed to higher angles. Consequently, a larger share of the outlet light at low angles will be blue light than in the prior art lighting device. Other refractive structures than the BEF 312 are feasible, such as asymmetric prism foils, which can be obtained from 3M or Luminit. Thus, as regards the light output of the lighting device 300, the ratio of intensity of light with the first wavelength range to the intensity of light with the second wavelength range is larger at low angles to a light output surface of the lighting device than at high angles to the light output surface. In this embodiment the light output surface is the outer surface of the wavelength converting member 310.

A second embodiment of the lighting device 400 is similar to the first embodiment, and comprises a box shaped housing 402, multiple light sources 408 arranged at a rear wall 404, a wavelength converting member 410, and a color distribution member 412 arranged between the light sources 408 and the wavelength converting member 410. Additionally, this second embodiment comprises collimators 420 arranged at the light sources 408. More particularly, each light source 408 is provided with a collimator 420 surrounding the light source 408 in a manner that is known as such. For instance, the collimator 420 has the shape of a truncated cone, which has a circular or polygonal cross-section, where the light is output at the wider end of the collimator 420. The collimator 420 is made from e.g. a light reflective sheet material or an optical element of the TIR (Total Internal reflection) type.

A third embodiment of the lighting device 500 has several parts in common with the second embodiment. Thus the lighting device 500 comprises a box shaped housing 502, having a rear wall 504 and side walls 506, multiple light sources 508, a plate shaped wavelength converting member 510, and collimators 520 arranged at the light sources 508. However, this third embodiment does not comprise a refractive element but the color distribution member is constituted by the collimators and the arrangement of the collimators 520 and the light sources 508. More particularly, the light sources 508 are mounted at the side walls 506 or at the rear wall 504 but adjacent the side walls 506, and they and the collimator 520 are directed obliquely towards the wavelength converting member 510. This means that each collimator 520 has a centre axis which is inclined with respect to a plane in which the wavelength converting member 510 primarily extends. Thereby, like in the second embodiment, a substantial part of the emitted light reaches the wavelength converting member 510 at low angles. The result is a large enough share of non-converted light 525 at low angles, and a large enough share of converted light 530 at high angles in order to obtain the desired perception of a window, due to bluish light, at low angles and good working light at high angles due to bright enough white light.

According to a fourth embodiment of the lighting device 600, it comprises a box shaped housing 602, having a reflective inner surface, and having a rear wall 604 and side walls 606. The lighting device 600 further comprises multiple light sources 608 arranged at one of the side walls 606 of the housing 602. The light sources 608 emit light laterally of the housing, i.e. perpendicular to the side wall 606. The color distribution member comprises a plate shaped light guide 612 extending in parallel with the rear wall 604, wherein the light sources 608 emit light into the light guide 612. Furthermore, the lighting device 600 comprises a plate shaped wavelength converting member 610, which is arranged adjacent to the rear wall 604.

Figure 6:
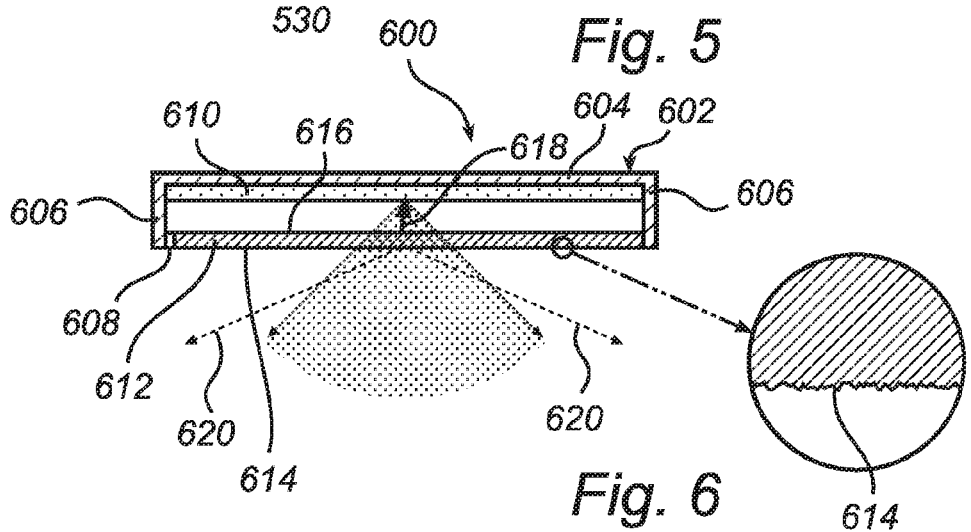

The light guide 612 has a front surface 614, which is structured and which constitutes the light output surface of the lighting device 600, and a rear surface 616, which faces the wavelength converting member 610. A part of the light emitted by the light sources 608 is leaving the light guide 612 through the rear surface 616 thereof, and the rest of the light emitted by the light sources 608 is leaving the light guide 612 through the front surface 614 thereof. The light 618 that is emitted rearwards, as shown most schematically with a single light ray in FIG. 6, passes the wavelength converting member 610, is reflected by the rear wall 604, passes the wavelength converting member 610 again and exits through the light guide 612. Thus, the light 618 emitted rearwards is partially converted to the second wavelength range before being output from the lighting device 600, while the light emitted forwards from the light guide 612 is non-converted light of the first wavelength range. The converted light emitted by the light converting element has a lambertian distribution. In the same way first wavelength which is emitted rearwards which is not converted becomes diffusely reflected and also has a lambertian distribution. Due to the structured front surface 614 of the light guide 612 the light of the first wavelength range 620, i.e. the blue light, is spread to low angles to such an extent that the desired effect is achieved.

Figure 7:
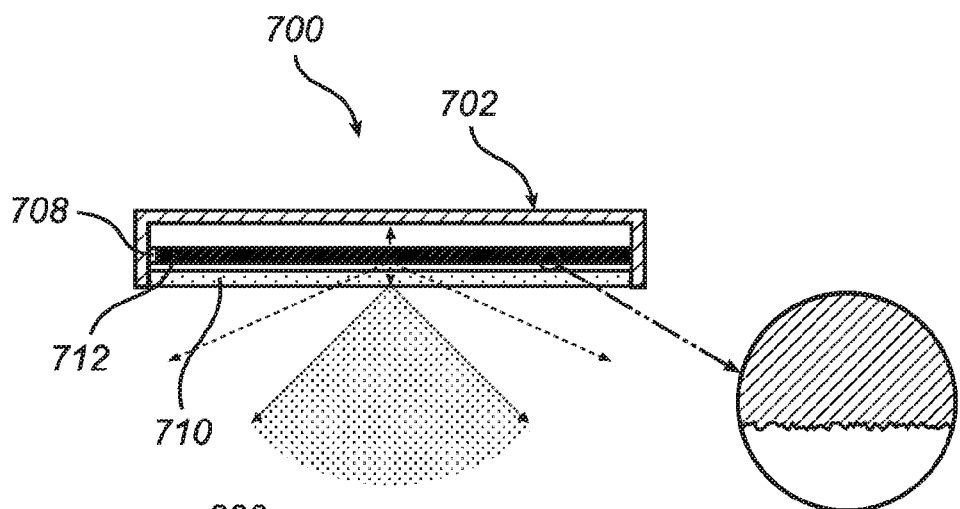

According to a fifth embodiment of the lighting device 700, as shown in FIG. 7, it comprises the same parts as the fourth embodiment, i.e. the housing 702, the light sources 708, the wavelength converting member 710, and the color distribution member 712. However, the wavelength converting member 710 is arranged downstream of the color distribution member, i.e. the light guide, 712 instead of upstream thereof.

It should be noted that throughout this application the terms upstream and downstream are related to the direction of propagation of the output light that exits the lighting device.

Furthermore, as regards embodiments four and five, the structured surface of the light guide can have an irregular structure, i.e. a general roughness, or a geometrically well defined structure, such as mini pyramids, etc. Additionally, light sources can be arranged at several sides of the light source, such as at two sides or four sides.

Figure 8:
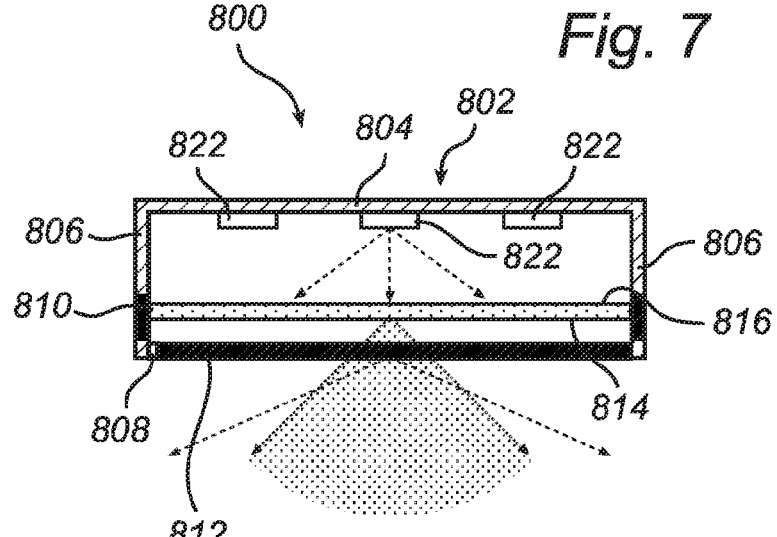

A sixth embodiment of the lighting device 800, as shown in FIG. 8, has the same parts as the fifth embodiment. However, additional light sources have been added at the rear wall of the housing, and the wavelength converting member is differently positioned. More particularly, the lighting device 800 comprises a box shaped housing 802, having a rear wall 804 and side walls 806, a first set of light sources 808 arranged at at least one of the side walls 806 and emitting light laterally, and a plate shaped light guide 812, which extends in parallel with the rear wall 804, and which is engaged with the first set of light sources 808, which consequently emit light into the light guide 812 through an edge surface thereof. The light guide 812 embodies an exit window of the lighting device 800. The light guide 812 has a structured front surface 814, and a smooth rear surface 816. Furthermore, the lighting device 800 comprises a plate shaped wavelength converting member 810, arranged between the rear wall 804 and the light guide 812, and a second set of light sources 822, arranged at the rear wall and emitting light towards the wavelength converting member 810. As described above, blue light from light sources 822 of the first wavelength range leaves becomes partially converted by the light converting element and the converted light as well as remaining blue light pass through the light guide 812 in a distributed manner through the front surface 814 thereof. Light from the light sources 802 coupled into the wave guide 812 exits the wave guide, and hence the lighting device 800, at low angles, and the amount thereof is large enough to cause the desired bluish appearance of a window. The light which exits the light guide rearwards, passes the wavelength converting member 812, where it is partially converted and then gets reflected by the inner surfaces of the housing 802, and exits the lighting device 800 having mainly lambertian distribution. The second set of light sources 822 helps to generate additional luminance. In this way it is possible to obtain a proper ratio of blue light at low angles and white light superimposed on top of it.

Figure 9:
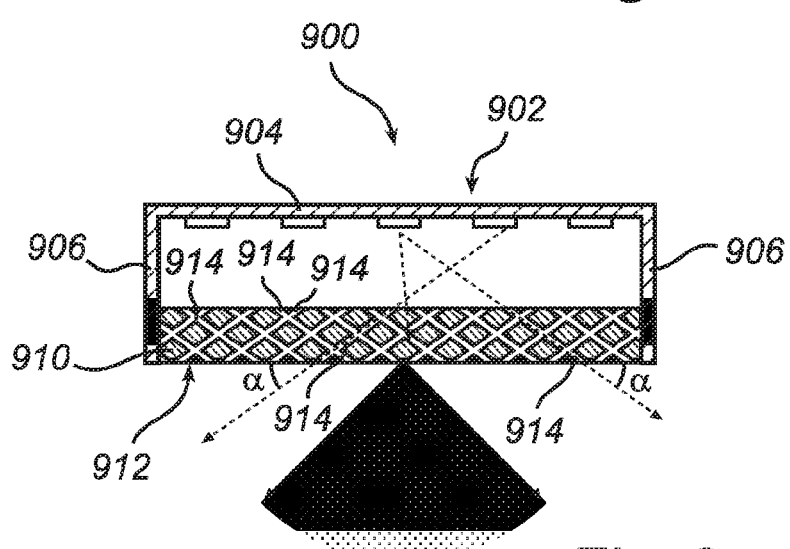

A seventh embodiment of the lighting device 900, as shown in FIG. 9, comprises a box shaped housing 902, having a rear wall 904, and side walls 906, multiple light sources 908, arranged at the rear wall and emitting light away from the rear wall 904, a wavelength converting member 910, arranged at the opening of the housing 902, and embodying a light exit window, and a color distribution member 912, which is integrated with the wavelength converting member 910. The color distribution member 912 comprises a structure of pipes 914, extending at low angles through the wavelength converting member 910, and providing wavelength conversion free light passages. Thereby, an increased amount of the light of the first wavelength range passes the wavelength converting member 910 without being converted than in the prior art lighting device. The increase is obtained at the angles α at which the pipes 914 extend through the wavelength converting member 910, and they are low angles. In FIG. 9 the pipes 914 are shown as extending in different directions through the wavelength converting member 910, but at the same angle relative to the front surface of the wavelength converting member 910, while it is possible to provide the pipes 914 at two or more different angles. The pipes 914 are empty, i.e. air filled, or filled with a transparent material.

Figure 10:
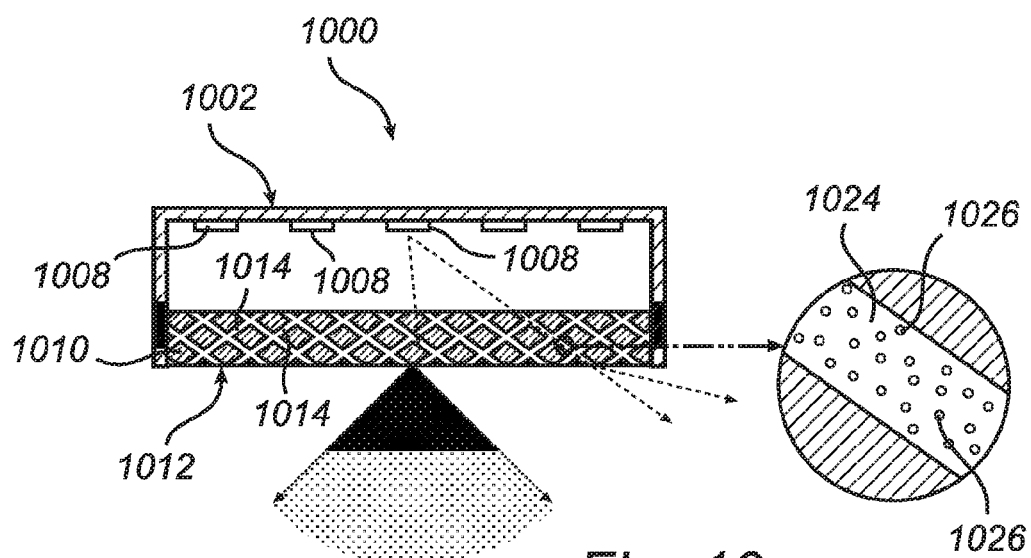

According to an eighth embodiment of the lighting device 1000, as shown in FIG. 10, the pipes 1014 are filled with a transparent material 1024, which additionally contains scattering material 1026, which scatters the non-converted light passing through the pipes 1014 over a wider angle range compared with the embodiments described above. For instance, the transparent material can be polymers such as such as PMMA (poly methyl metha acrylate), PS (poly styrene) and PC (poly carbonate), and the scattering material can be scattering particles such as $TiO_2$, $BaSO_4$ or $Al_2O_3$ particles. Except for this difference, the construction of the eighth embodiment corresponds with that of the seventh embodiment. Thus, the lighting device 1000 comprises a housing 1002, light sources 1008, a wavelength converting member 1010 and a color distribution member 1012, which comprises pipes 1014 extending obliquely through the wavelength converting member 1010.

Figure 11:
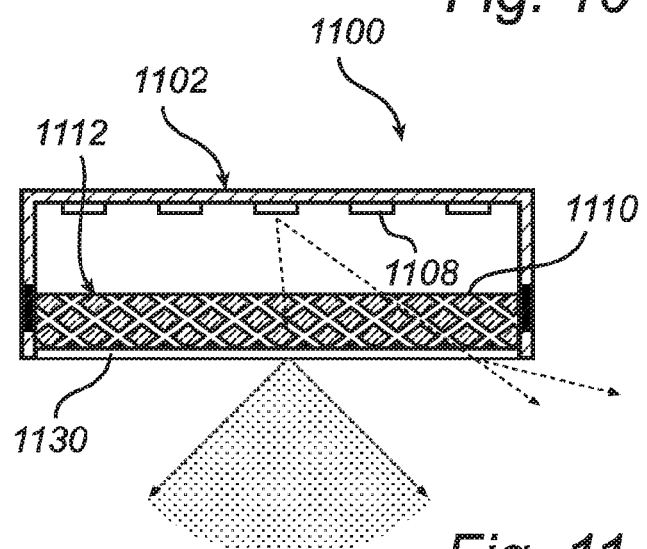

In a ninth embodiment, as shown in FIG. 11, the lighting device 1100 comprises all parts, such as a housing 1102, light sources 1108, a wavelength converting member 1110, and a color distribution member 1112, included in the eighth embodiment. Furthermore, the lighting device 1100 comprises a plate shaped diffuser 1130 arranged downstream of the wavelength converting member 1110 and thereby forming the exit window. Thereby, the output light is slightly adapted such that the bluish light at low angles smoothly changes in more yellowish light at high angles.

Figure 12:
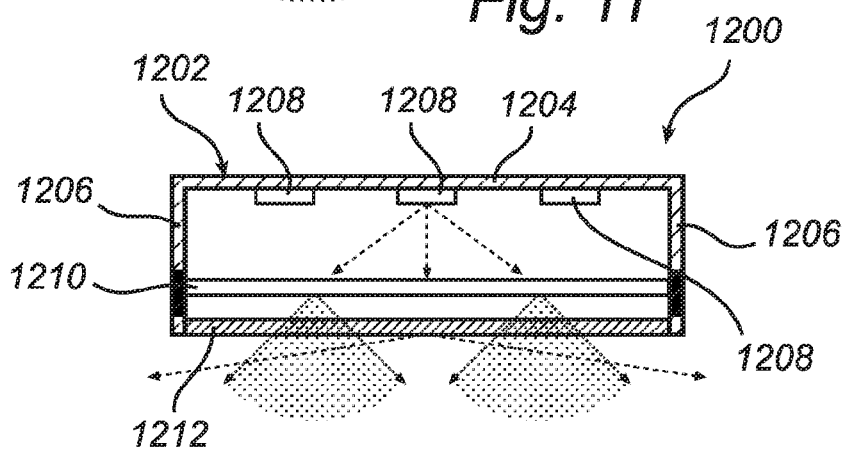
Figure 13:
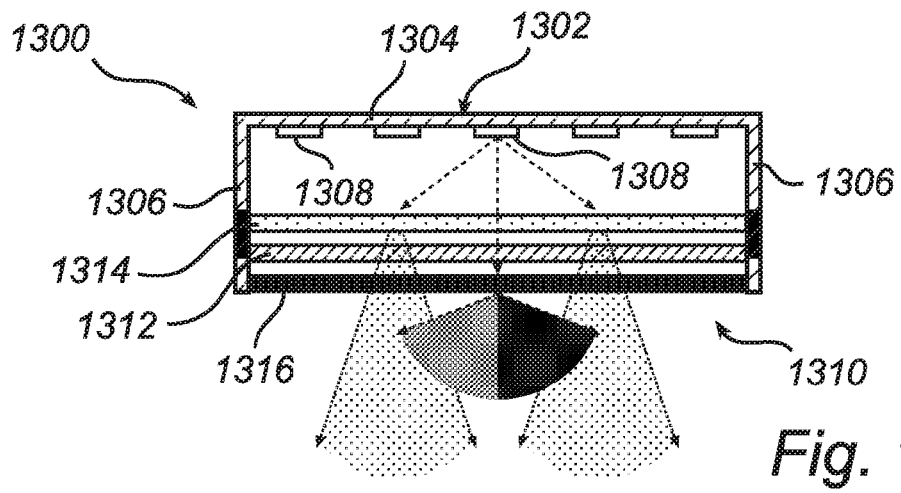

According to a tenth embodiment of the lighting device, as shown in FIG. 12, the lighting device 1200 comprises a box shaped housing 1202, having a rear wall 1204 and side walls 1206, light sources 1208, arranged at the rear wall 1204 and emitting light towards the opening of the housing 1202, a plate shaped wavelength converting member 1210, arranged downstream of the light sources 1208, and a plate shaped color distribution member 1212, arranged downstream of the wavelength converting member 1210. The color distribution member 1212 is constituted by a wavelength selective refraction element, which is arranged to refract non-converted light to low angles and let converted light pass unrefracted. The wavelength selective refraction element 1212 is, for instance, a transparent plate that contains photonic structures or has a dichroic layer. The effect as regards the appearance of the lighting device 1200 is the same as for the embodiments above.

According to an eleventh embodiment of the lighting device 1300 it comprises a box shaped housing 1302, having a rear wall 1302 and side walls 1306, multiple light sources 1308 arranged at the rear wall 1304, a wavelength converting member 1310, and a color distribution member 1312. The wavelength converting member 1310 comprises a plate shaped first wavelength converting element 1314, consisting of a first wavelength converting material, which converts light of a first wavelength range, here about 350-450 nm, to light of a second wavelength range, here emission in the wavelength range above 500 nm, typically light in the range of about 500-750 nm, especially 550-700 nm. The wavelength converting member 1310 comprises a plate shaped second wavelength converting element 1316, consisting of a second wavelength converting material, which converts light of the first wavelength range into light of a third wavelength range, here about 440-480 nm. The color distribution member 1312 is embodied by a collimating plate 1312, for instance a brightness enhancement film. The first wavelength converting element 1314 is arranged downstream of the light sources 1308. The collimating plate 1312, such as a BEF foil, is arranged downstream of the first wavelength converting element 1314. The second wavelength converting element 1316 is arranged downstream of the collimating plate 1312. Light of the first wavelength range emitted from the light sources 1308, such as violet-blue light, is converted to yellowish light and emitted in a Lambertian way by the first wavelength converting element 1314. Subsequently, the yellowish converted light is collimated by the collimating plate 1312. Next, the violet light is converted to bluish light by the second wavelength converting element 1316. In this way light at low angles is more bluish.

Figure 14:
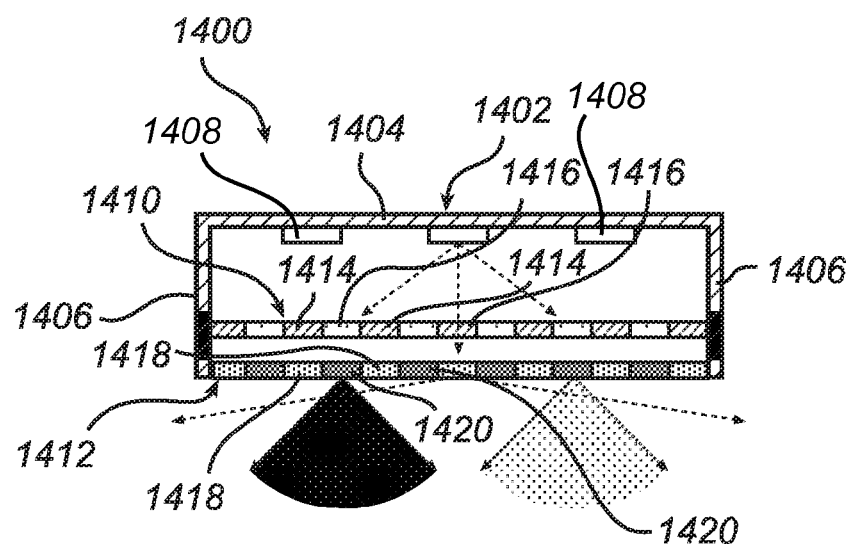
Figure 15:
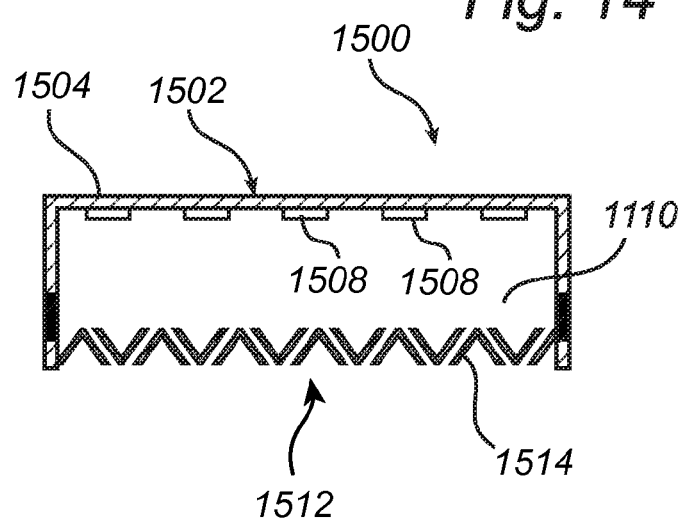

According to a twelfth embodiment of the lighting device 1400, as shown in FIG. 14, the lighting device 1400 comprises a box shaped housing 1402, having a rear wall 1404 and side walls 1406, multiple light sources 1408 arranged at the rear wall 1404, a wavelength converting member 1410, and a color distribution member 1412. The wavelength converting member 1410 is plate shaped and pixelated such that the first wavelength converting material is arranged as a pattern of material portions 1414, which are arranged alternately with a pattern of non-converting portions 1416 throughout the wavelength converting member 1410. The color distribution member 1412 consists of a pixelated optical element arranged downstream of the wavelength converting member 1410 and comprising a pattern of refracting portions 1418, which are arranged alternately with a pattern of light collimating portions 1420. The refracting portions 1418 are aligned with the non-converting portions 1416, and wherein the light collimating portions 1420 are aligned with the converting portions 1414.

In accordance with a thirteenth embodiment of the lighting device 1500, the wavelength converting member and the light distribution member are integrated in the shape of a grid 1512. Strips 1514 of the grid constitute the wavelength converting member, and interspaces 1510 of the grid constitute the light distribution member. The interspaces 1510 are inclined to the exit window of the lighting device 1500. The strips 1514 are generally V-shaped in cross-section, the mouth of the V facing, and in fact constituting, the exit window. Preferably the strips 1514 are arranged to form an angle in relation to the exit window, or light output surface, which is larger than 30 degrees.

Above embodiments of the lighting device according to the present invention as defined in the appended claims have been described. These should only be seen as merely non-limiting examples. As understood by the person skilled in the art, many modifications and alternative embodiments are possible within the scope of the invention as defined by the appended claims.

It is to be noted that in embodiments of the lighting device the wavelength converting material may comprise an organic luminescent molecule. Examples of suitable organic luminescent materials include perylene derivatives, such as Lumogen® F Red 305, Lumogen® F Orange 240, Lumogen® F Yellow 083 and/or Lumogen® F Yellow 170 (all available from BASF).

Furthermore, in embodiments of the lighting device the wavelength converting material may comprise an inorganic luminescent material. Examples of inorganic wavelength converting materials may include, but are not limited to, cerium (Ce) doped YAG (Y3Al5O12) or LuAG (Lu3Al5O12). Ce doped YAG emits yellowish light, whereas Ce doped LuAG emits yellow-greenish light. Examples of other inorganic phosphors materials which emit red light may include, but are not limited to ECAS (ECAS, which is Ca1-xAlSiN3:Eux wherein 0<x≤1; preferably 0<x≤0.2) and BSSN 20 (BSSNE, which is Ba2-x-zMxSi5-yAlyN8-yOy:Euz wherein M represents Sr or Ca, 0≤x≤1 and preferably 0≤x≤0.2, 0≤y≤4, and 0.0005≤z≤0.05).

In embodiments of the invention the wavelength converting material may comprise quantum dots. Most known quantum dots with emission in the visible range are based on cadmium selenide (CdSe) with shell such as cadmium sulfide (CdS) and zinc sulfide (ZnS). Cadmium free quantum dots such as indium phosphode (InP), and copper indium sulfide (CuInS2) and/or silver indium sulfide (AgInS2) can also be used. Due to the narrow emission bands, quantum dots show saturated colors. Furthermore the emission color can be tuned by adapting the size of the quantum dots. Any type of quantum dot known in the art may be used in the present invention, provided that it has the appropriate wavelength conversion characteristics. For example, in embodiments of the invention, quantum dots comprising CdSe, InP, CuInS2, or AgInS2 may be used. However, it may be preferred for reasons of environmental safety and concern to use cadmium-free quantum dots or at least quantum dots having a very low cadmium content.

It is to be noted that for the purposes of his application, and in particular with regard to the appended claims, the word "comprising" does not exclude other elements or steps, and the word "a" or "an" does not exclude a plurality, which per se will be evident to a person skilled in the art.

The invention claimed is:
1. A lighting device comprising:
a housing and multiple light sources arranged in the housing, the light sources emitting light of a first wavelength range;
a wavelength converting member arranged at a distance from said light sources, said wavelength converting member comprising a first wavelength converting material configured to convert a part of said light of a first wavelength range into light of a second wavelength range; and a color distribution member providing a color distribution of the light emitted from the lighting device where the ratio of intensity of light with the first wavelength range to the intensity of light with the second wavelength range is larger at low angles to a light output surface of the lighting device than at high angles to the light output surface, wherein the color distribution member comprises a light redirecting element, arranged between the light sources and the wavelength converting member, which redirects incoming light from the light sources reaching the light redirecting element at an angle of incidence to outgoing light leaving the light redirecting element at a lower angle than the angle of incidence.

2. The lighting device according to claim 1, wherein the light directing element comprises at least one element of a group of elements consisting of a refractive optical element, a diffractive optical element, and a waveguide.

3. The lighting device according to claim 2, wherein the light directing element has a structured surface with a prismatic surface relief, and an opposite smooth surface, wherein the structured surface is facing the light sources.

4. The lighting device according to claim 1 wherein each light source is provided with a collimator.

5. A lighting device comprising:
a housing and multiple light sources arranged in the housing, the light sources emitting light of a first wavelength range;
a wavelength converting member arranged at a distance from said light sources, said wavelength converting member comprising a first wavelength converting material configured to convert a part of said light of a first wavelength range into light of a second wavelength range; and
a color distribution member providing a color distribution of the light emitted from the lighting device where the ratio of intensity of light with the first wavelength range to the intensity of light with the second wavelength range is larger at low angles to a light output surface of the lighting device than at high angles to the light output surface,
wherein the color distribution member comprises a plurality of collimators, each arranged at a respective light source, wherein each collimator has a center axis which is inclined with respect to a plane in which the wavelength converting member primarily extends.

6. A lighting device comprising:
a housing and multiple light sources arranged in the housing, the light sources emitting light of a first wavelength range;
a wavelength converting member arranged at a distance from said light sources, said wavelength converting member comprising a first wavelength converting material configured to convert a part of said light of a first wavelength range into light of a second wavelength range; and
a color distribution member providing a color distribution of the light emitted from the lighting device where the ratio of intensity of light with the first wavelength range to the intensity of light with the second wavelength range is larger at low angles to a light output surface of the lighting device than at high angles to the light output surface, wherein the housing is box shaped having a rear wall and side walls which are reflective on the inside, wherein a first set of light sources comprising at least some of the light sources is arranged at a side wall of the housing and emit light laterally of the housing, wherein the color distribution member comprises a plate shaped light guide extending in parallel with the rear wall, wherein said set of light sources emits light into the light guide, wherein the light guide has a front surface, which is structured and which constitutes the light output surface of the lighting device, and a rear surface, which faces the wavelength converting member, and wherein a part of the light emitted by said set of light sources is leaving the light guide through the rear surface, and the rest of the light emitted by said set of light sources is leaving the light guide through the front surface.

7. The lighting device according to claim 6, wherein the wavelength converting member is arranged between the rear wall and the light guide, and wherein a second set of light sources, comprising some of the light sources, is arranged at the rear wall of the housing and emits light towards the wavelength converting member.

8. A lighting device comprising:
a housing and multiple light sources arranged in the housing, the light sources emitting light of a first wavelength range;
a wavelength converting member arranged at a distance from said light sources, said wavelength converting member comprising a first wavelength converting material configured to convert a part of said light of a first wavelength range into light of a second wavelength range; and
a color distribution member providing a color distribution of the light emitted from the lighting device where the ratio of intensity of light with the first wavelength range to the intensity of light with the second wavelength range is larger at low angles to a light output surface of the lighting device than at high angles to the light output surface,
wherein the color distribution member comprises a structure of pipes extending at low angles through the wavelength converting member, and providing wavelength conversion free light passages.

9. The lighting device according to claim 8, wherein the pipes are filled with a transparent material.

10. The lighting device according to claim 9, wherein the transparent material contains scattering material.

11. The lighting device according to claim 10, further comprising a diffuser arranged downstream of the wavelength converting member.

12. A lighting device comprising:
a housing and multiple light sources arranged in the housing, the light sources emitting light of a first wavelength range;
a wavelength converting member arranged at a distance from said light sources, said wavelength converting member comprising a first wavelength converting material configured to convert a part of said light of a first wavelength range into light of a second wavelength range; and
a color distribution member providing a color distribution of the light emitted from the lighting device where the ratio of intensity of light with the first wavelength range to the intensity of light with the second wavelength range is larger at low angles to a light output surface of the lighting device than at high angles to the light output surface, wherein the first wavelength converting material is embodied by a plate shaped first wavelength converting element, wherein the wavelength converting member comprises second wavelength converting material configured to convert light of said first wavelength range into light of a third wavelength range, which second wavelength converting material is embodied by a second plate shaped wavelength converting element, wherein said color distribution member comprises a collimating plate, wherein the first wavelength converting element is arranged downstream of the light sources, the collimating plate is arranged downstream of the first wavelength converting element, and the second wavelength converting element is arranged downstream of the collimating plate.

13. A lighting device comprising:

a housing and multiple light sources arranged in the housing, the light sources emitting light of a first wavelength range;

a wavelength converting member arranged at a distance from said light sources, said wavelength converting member comprising a first wavelength converting material configured to convert a part of said light of a first wavelength range into light of a second wavelength range; and a color distribution member providing a color distribution of the light emitted from the lighting device where the ratio of intensity of light with the first wavelength range to the intensity of light with the second wavelength range is larger at low angles to a light output surface of the lighting device than at high angles to the light output surface, wherein the wavelength converting member is pixelated such that the first wavelength converting material is arranged as a pattern of material portions, which are arranged alternately with a pattern of non-converting portions throughout the wavelength converting member, wherein the color distribution member comprises a pixelated optical element arranged downstream of the wavelength converting member and comprising a pattern of refracting portions, which are arranged alternately with a pattern of light collimating portions, wherein the refracting portions are aligned with the non-converting portions, and wherein the light collimating portions are aligned with the converting portions.

* * * * *